United States Patent
Dhayni

(10) Patent No.: US 9,455,859 B2
(45) Date of Patent: Sep. 27, 2016

(54) REDUCTION OF PEAK-TO-AVERAGE RATIO IN OFDM SYSTEMS

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/420,791

(22) PCT Filed: Sep. 3, 2013

(86) PCT No.: PCT/EP2013/068122
§ 371 (c)(1),
(2) Date: Feb. 10, 2015

(87) PCT Pub. No.: WO2014/037318
PCT Pub. Date: Mar. 13, 2014

(65) Prior Publication Data
US 2015/0207656 A1     Jul. 23, 2015

Related U.S. Application Data

(60) Provisional application No. 61/703,035, filed on Sep. 19, 2012.

(30) Foreign Application Priority Data

Sep. 4, 2012   (EP) ..................................... 12306052
Jul. 5, 2013   (EP) ..................................... 13305958

(51) Int. Cl.
*H04K 1/10*     (2006.01)
*H04L 27/26*     (2006.01)

(52) U.S. Cl.
CPC ....... *H04L 27/2623* (2013.01); *H04L 27/2624* (2013.01)

(58) Field of Classification Search
CPC ............................. H04L 27/362; H04L 5/023
USPC ......................................................... 375/260
See application file for complete search history.

(56) References Cited

U.S. PATENT DOCUMENTS 8,792,572 B1 *   7/2014   McGowan et al. ........... 375/260
9,008,223 B1 *   4/2015   Tamma et al. ................ 375/296

(Continued)

OTHER PUBLICATIONS

International Search Report issued in corresponding International application No. PCT/EP2013/068122, date of mailing of report Nov. 13, 2013.

(Continued)

*Primary Examiner* — Santiago Garcia
(74) *Attorney, Agent, or Firm* — Patent Portfolio Builders PLLC

(57) ABSTRACT

An emitter for modulating and emitting an orthogonal frequency division multiplexing signal through a transmission channel (TC), comprising a frequency-to-time converter for converting symbols to be transmitted into time symbols, and means for serializing and amplifying said time symbol so as to emit it as an OFDM signal through said transmission channel, said emitter further comprising: means (12) for clipping said time symbols; time-to-frequency convertor (13) for converting said time symbols; and means for applying a set of data subcarriers of the outputs of said time-to-frequency converter as inputs of said frequency-to-time converter wherein out-of-band subcarriers are set to zero and the clipping level is set to a minimum level allowing the amplifier to operate in an efficient region.

14 Claims, 3 Drawing Sheets

(56) References Cited

U.S. PATENT DOCUMENTS

| | | | |
|---|---|---|---|
| 2004/0165524 A1* | 8/2004 | Chen et al. | 370/208 |
| 2007/0258528 A1* | 11/2007 | Kwun et al. | 375/260 |
| 2009/0092195 A1* | 4/2009 | Guo et al. | 375/260 |
| 2010/0046662 A1* | 2/2010 | Park et al. | 375/295 |
| 2010/0135421 A1* | 6/2010 | Jung et al. | 375/260 |
| 2013/0266082 A1* | 10/2013 | McGowan et al. | 375/260 |
| 2013/0329829 A1* | 12/2013 | Yokomakura et al. | 375/285 |
| 2013/0336276 A1* | 12/2013 | Takahashi et al. | 370/329 |

OTHER PUBLICATIONS

Extended European Search Report issued in corresponding European application No. EP 13 30 5958, date of completion of the search Nov. 6, 2013.

Guel, Désiré, et al., "Analysis and Comparison of Clipping Techniques for OFDM Peak-to-Average Power Ratio Reduction," 2009 16th International Conference on Digital Signal Processing, IEEE, Piscataway, NJ, USA, Jul. 5, 2009, pp. 1-6, XP031510214; ISBN: 978-1-4244-3297-4.

* cited by examiner

REDUCTION OF PEAK-TO-AVERAGE RATIO IN OFDM SYSTEMS

FIELD OF THE INVENTION

The invention relates to the field of multicarrier communications systems and more particularly to Orthogonal Frequency-Division Multiplexing (OFCM) systems including wireless OFDM systems.

BACKGROUND OF THE INVENTION

Orthogonal Frequency-Division Multiplexing (OFDM), also referred to as "multi-carrier modulation" (MCM) or "Discrete Multi-Tone Modulation" (DMTM), splits up and encodes high-speed incoming serial data, modulating it over a plurality of different carrier frequencies (called "subcarriers") within a communication channel to transmit the data from one user to another. The serial information is broken up into a plurality of sub-signals that are transmitted simultaneously over the subcarriers in parallel.

By spacing the subcarriers frequencies at intervals of the frequency of the symbol to transmit, the peak power component of each modulated subcarriers line up exactly with zero power components of the other modulated subcarriers, thereby providing orthogonality (independence and separability) of the individual subcarriers. This allows a good spectral efficiency (close to optimal) and minimal inter-channel interference (ICI), i.e. interferences between the subcarriers.

For these reasons, OFDM is used in many applications. Many digital transmission systems have adopted OFDM as the modulation technique such as digital video broadcasting terrestrial TV (DVB-T), digital audio broadcasting (DAB), terrestrial integrated services digital broadcasting (ISDB-T), digital subscriber line (xDSL), WLAN systems, e.g. based on the IEEE 802.11 standard, cable TV systems, etc.

An OFDM signal is a signal with varying amplitude envelop, i.e. which carry information both in the amplitude and in the phase of the transmitted signal. In general, such a signal makes more complex the design of the transmitter according to the extent by which the amplitude varies. This extent is usually captured by the PAR parameter, defined as the peak-to-average power ratio. High PAR corresponds to modulation schemes with largely-varying amplitude envelop, whereas low PAR corresponds to modulation scheme where the amplitude envelop varies to a small extent.

High PAR modulation schemes are problematic to handle by transmission systems. For instance, in some systems, high peaks may be clipped by non-linear devices at the transmitter sides, causing undesirable effects such as high out-of-band activity ("regrowth") and in-band distortion.

To prevent this phenomenon, the transmitter design should be carefully adapted, especially the analog-to-digital converter (ADC), but still some disadvantages are not negligible like a reduced efficiency of the radio frequency amplifier.

Despite these negative aspects, OFDM remains very interesting when weighted with its advantages, notably because of a much higher spectral efficiency.

According to the IEEE (Institute of Electrical and Electronics Engineers) 802.11a/g standards, the theoretical maximum PAR is around 17 dB. In other words, the peak amplitude excursion of an 802.11a/g-compliant OFDM signal can be up to seven times larger than the average signal.

In order to prevent bad effects of a PAR at around 17 dB (i.e. to prevent distortion and to be able to reproduce the amplified output signal faithfully), the transmitter would need to avoid any undesired clipping, even during the peak excursions of the signal.

This requires the power amplifier to be designed so as to have minimal compression at the peak power. We can assume that a 1 dB compression is acceptable at peak power. However, most of the time, the power amplifier operates around the average amplitude (and not at the peak amplitude). This thus means that, most of the time, the amplifier operates at a power 17 dB lower than the 1 dB peak compression point, i.e. 7 times lower.

For instance, an inductively loaded class-A transmitter and power amplifier can achieve a maximum power efficiency of 50% (achieved when transmitting the maximum output swing). When it functions at 17 dB lower power below the 1 dB compression point, the best case achieved efficiency would be only 50/7=7%.

Of course, a transmitter amplifier with a power efficiency of 7% is not acceptable.

Some solutions try to improve the situation by optimizing the transmitter chain in order to achieve a better linearity and to obtain higher efficiency. The 1 dB compression point of the amplifier is increased and the amount of backoff required to achieve a particular error vector magnitude (EVM) is reduced. The backoff is defined as how much the signal level must be below the 1 dB compression point in order to reach a certain specified EVM.

These solutions are however not sufficient as they do not lead to efficient enough amplification. Furthermore, they do not simplify the design of the transmitter chain and, on the contrary, generally make it worse.

SUMMARY OF THE INVENTION

This is achieved with a method for modulating and emitting an orthogonal frequency division multiplexing signal through a transmission channel, comprising performing a frequency-to-time conversion of symbols to be transmitted to generate time symbols, and serializing and amplifying said time symbol so as to emit it as an OFDM signal through said transmission channel, said method further comprising
  clipping said time symbols;
  performing a time-to-frequency conversion of said time symbols; and
  applying a set of subcarriers of the result of said time-to-frequency conversion as inputs of said frequency-to-time conversion.

According to embodiments of the invention the method may comprise one or several of the following features, taken alone or in partial or full combinations:
  said set of subcarriers corresponds to data subcarriers;
  out-of-band zero subcarriers are applied as input of the frequency-to-time conversion, outside of the bandwidth of said data subcarriers;
  said time-to-frequency conversion and said frequency-to-time conversion are performed with a 128-bit algorithm;
  clipping said time symbols consists in using the minimum possible clipping level leading to the minimum possible peak-to-average power ratio.
  this clipping level is −7 dB.

Another aspect of the invention relates to a computer program comprising program instructions and being loadable into a data-processing unit and adapted to cause execution of the method according previously defined, when the computer program is run by the data processing unit.

Another aspect of the invention relates to a data storage medium having recorded thereon the computer program previously described.

Another aspect of the invention relates to an emitter for modulating and emitting an orthogonal frequency division multiplexing signal through a transmission channel, comprising a frequency-to-time converter for converting symbols to be transmitted into time symbols, and means for serializing and amplifying said time symbol so as to emit it as an OFDM signal through said transmission channel, said emitter further comprising:

Means for clipping said time symbols;
Time-to-frequency convertor for converting said time symbols; and
Means for applying a set of subcarriers of the outputs of said time-to-frequency converter as inputs of said frequency-to-time converter According to embodiments of the invention the method may comprise one or several of the following features, taken alone or in partial or full combinations:
said set of subcarriers corresponds to data subcarriers
out-of-band zero subcarriers are applied as input of the frequency-to-time converter, outside of the bandwidth of said data subcarriers.
said time-to-frequency converter and said frequency-to-time converters have a length of 128 bits.
clipping said time symbols consists in using the minimum possible clipping level leading to the minimum possible peak-to-average power ratio.
said clipping level is −7 dB.
The emitter is adapted to emit 802.11 standard-compliant OFDM signal.

DETAILED DESCRIPTION OF EMBODIMENTS OF THE INVENTION

Figure 1:
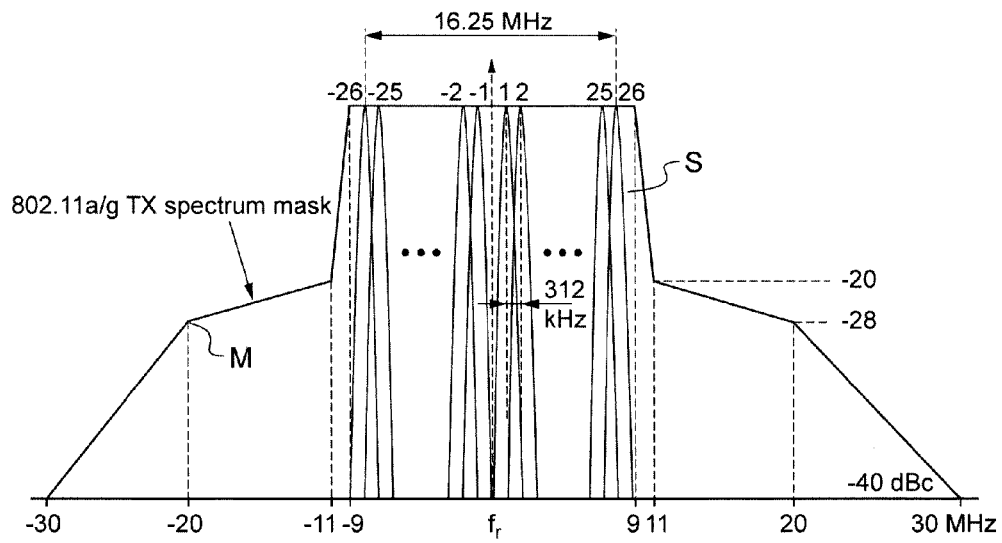
FIG. 1 depicts a spectral mask according to 802.11a/g standards and a typical OFDM signal.

The FIG. 1 depicts a spectral mask M according to 802.11a/g standards and a typical OFDM signal S. The transmitted spectral density of the signal S should fall below this spectral mask M.

The signal S is a combination of multiple subcarriers signals separated by 312 kHz, and around a central frequency Fc. A total of 52 subcarriers are used, 48 of which are used for carrying data and 4 are so-called "pilot subcarriers". The numbers of the subcarriers are depicted by figures on top of the mask M. In total, the bandwidth of transmitted signal is 52×312 kHz=16.25 MHz.

The mask M aims at extracting this bandwidth by rejecting the frequencies outside of it, i.e. upper the $26^{th}$ subcarrier and below the $-26^{th}$ subcarrier, corresponding respectively to Fc+9 MHz and Fc−9 MHz. Accordingly, the mask drops to a −20 dB value at Fc+11 MHz and Fc−11 MHz (this −20 dB value is a value relative to the maximum spectral power density of the transmitted signal).

The spectral mask is relaxed within the interval [Fc−20 MHz; Fc−11 MHz] and the interval [Fc+11 MHz; Fc+20 MHz] to tolerate the out-of-band spectral regrowth of OFDM-coded signals. Beyond, Fc+20 MHz and Fc−20 MHz, the mark M rejects more strongly the signal.

As it has been explained above, the higher is the PAR, the more important is the spectral regrowth. Accordingly, the maximum acceptable PAR at the input of the transmitter amplifier would be the one that does not lead to a spectral regrowth that violates the specified spectral mask M of the transmitted signal S. As explained earlier, in the case of 802.11a/g standards, this corresponds to a maximum acceptable PAR of 17 dB that leads to a maximum class-A transmitter efficiency of only 7%.

One aspect of the invention consists in taking the problem according to a reverse approach. Instead of optimizing the transmitter chain to improve the amplifier's efficiency for a given PAR (e.g. the PAR specified by 802.11a/g standards), according to the invention, the PAR is reduced as much as needed to achieve acceptable transmission amplifier power efficiency.

Figure 2:
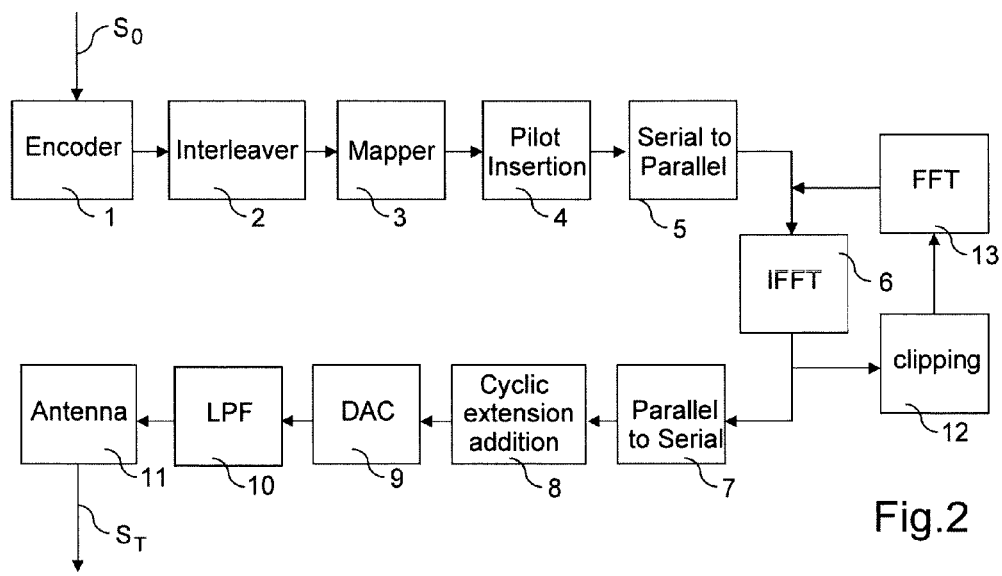
FIG. 2 shows a schematic functional architecture of a OFDM emitter according to an embodiment of the invention.

In other words, the constraint for the PAR is the linearity of the transmission chain (e.g. the power amplifier) and not (or not only) the spectral mask M. As a result, greater amplification efficiency can be achieved The FIG. 2 depicts a high-level functional architecture of an emitter according to an embodiment of the invention.

The principle of the OFDM system consists in transmitting several symbols (or signal) in parallel by assigning to each of them a different subcarrier, each subcarrier being orthogonal to the others. The number of subcarriers depends on the total bandwidth and on the duration of the symbol. In WLAN 802.11 a/g implementation the number of subcarriers is equal to 52, as previously mentioned.

The symbols to be transmitted, initially in the frequency domain, are transposed into the time domain and modulated for transmission over the transmission channel TC. The receiver transposes the received signal back to the frequency domain to extract the transmitted symbols.

The signal $S_0$ to be transmitted is inserted in a transmission chain made of several chained functional units, namely an encoder unit 1, an interleaver unit 2, a mapper unit 3, a pilot insertion unit 4, a serial-to-parallel transform unit 5, a frequency-to-time transform unit (or Inverse Fourier Transform) 6, a parallel-to-serial transform unit 7, a cyclic extension addition unit 8, a digital-to-analog converter (DAC) unit 9, a low-pass filter 10 and an antenna 11. The antenna transmits a transmitted signal $S_T$ (representative of the source signal $S_o$). This transmitted signal $S_T$ is sent over a communication channel to the antenna of an OFDM receiver.

The transmitted OFDM symbol signal spectrum is the sum in the frequency domain of the orthogonal subcarrier sinc functions that are superposed over each other. The individual symbols can be independently modulated by using different types of modulations techniques, like for instance QAM (Quadrature Amplitude Modulation) or PSK (Phase-Shift Keying).

This functional architecture can be compliant with the state-of-the-art functional architectures and the above-mentioned functional unit will not be described with full details here as the man skilled in the art is knowledgeable about them.

The frequency-to-time transform unit 6 is generally implemented by an inverse Fast Fourier Transform IFFT. This IFFT unit 6 splits the transmission chain into two subparts:

A frequency domain, upstream

A time domain, downstream.

According to the invention, at the output of the IFFT unit 6, the high peaks of the time domain OFDM symbol are clipped in order to reduce the peak-to-average ratio PAR (sometimes also called "peak-to-average power ratio", PAPR).

According to an embodiment of the invention, the clipping unit 12 uses the minimum possible clipping level that leads to the minimum possible PAR (at the input of the amplifier). In this way, the power efficiency reduction (imposed by the PAR) is minimized as much as possible.

Taking the example of 802.11a/g standard, in order to achieve the highest system efficiency, it is common to operate the power amplifier in class AB mode and back-off by about 7 dB from the 1 dB compression point (instead of the 17 dB with respect to the spectral mask as explained above).

The stages prior to the amplifier are typically operated at a larger back-off to make sure that the non-linearity is not dominated by these stages. Since these stages burn a relatively small power, this trade-off allows achieving the highest possible overall efficiency.

According to the above explanation, the maximum possible PAR must be limited to 7 dB. It thus means that the clipping occurs at 17−7=10 dB lower than the maximum possible peak at the output of the IFFT unit 6. It should be noted that the maximum possible peak occurs randomly and that its value is related to the modulation scheme. For instance, higher-order modulation schemes like 64-QAM or 256-QAM have higher peaks than lower-order modulation schemes like BPSK or 4-QAM.

As a result, the power efficiency is three times better than with the state-of-the art techniques.

The clipped OFDM symbol, outputted by the clipping unit 12, is provided to a time-to-frequency transform unit 13. This unit is generally implemented by a Fast Fourier Transform FFT.

This FFT unit 13 can be an added circuit in the OFDM emitter. However, in the common situation where the emitter is coupled with a receiver (to form an OFDM transceiver), the FFT unit 13 can be the one of the receiving circuitry. As a result, the hardware circuitry of the transceiver is let unchanged, and no additional chips are required.

The result of the FFT unit 13 on the clipped OFDM signal corresponds to the original OFDM frequency-domain signal plus the spectral regrowth on the out-of-band subcarriers.

The spectral regrowth caused by the clipping is then rejected by applying back only the data subcarriers as inputs to the IFFT unit 6.

Keeping the example implementation of 802.11a/g standards depicted in FIG. 1, the critical part of the spectral regrowth is gathered at 16.25/2 MHz at the left of the OFDM band and 16.25/2 at the right of the OFDM band. In other words, the spectral regrowth occupies a frequency band which is equal to the OFDM band (split into 2 subparts).

In order to be able to reject the clipping spectral regrowth, the FFT unit 13 and the IFFT unit 6 should each have a length of at least 52*2=104. As the length should be a power of 2, this number should be set to 128 (the higher power of 2 of 104).

Compared to most-common implementation, this embodiment of the invention requires then to shift from 64 FFT and IFFT algorithms to 128 FFT and IFFT algorithms. Extra hardware resources are however considered as negligible and anyhow far less than any existing solution of the prior art.

Other embodiments can be deployed in connection with other standards and transmission technologies.

Figure 3:
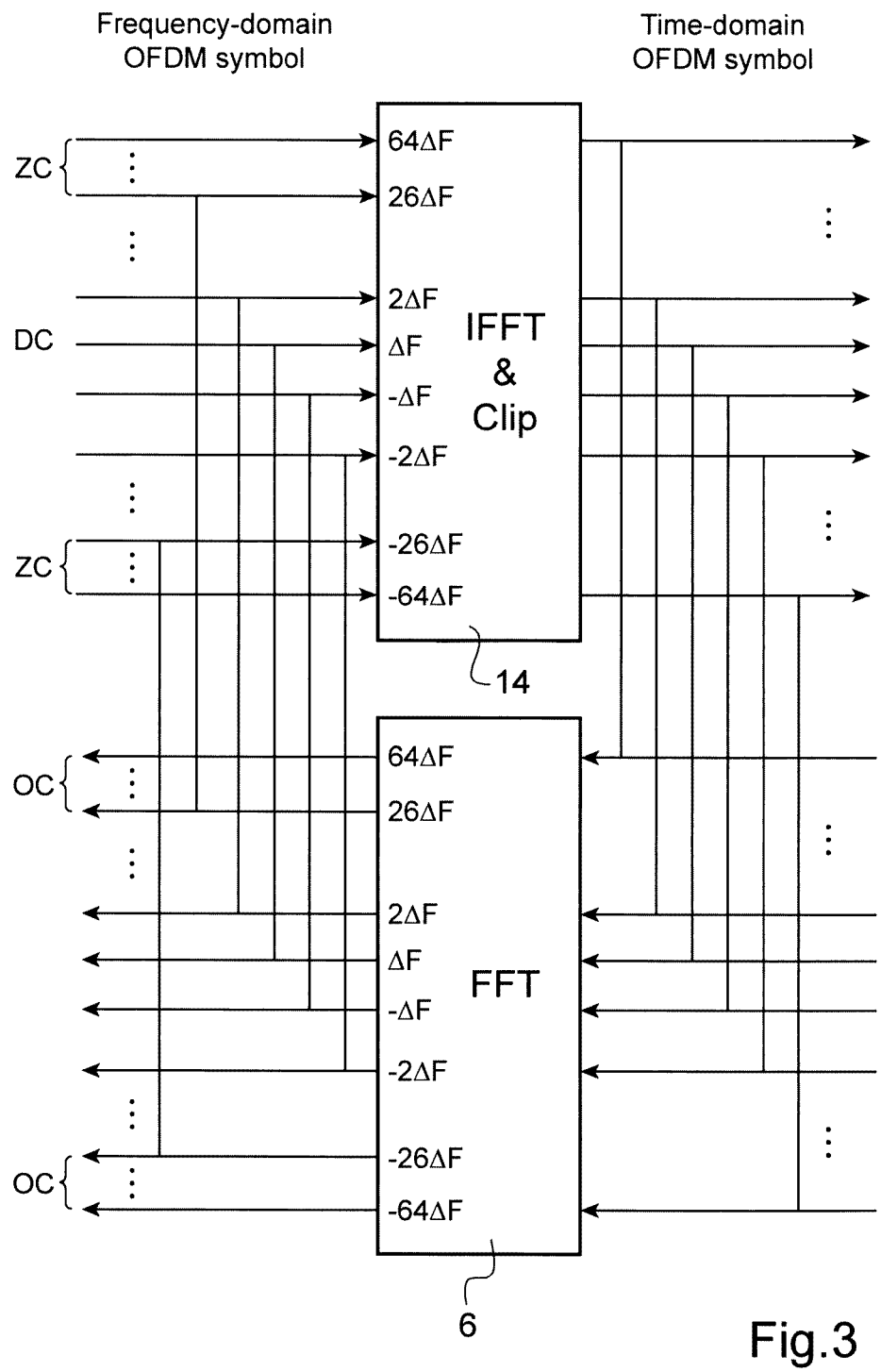
FIG. 3 shows a detail view of a part of the FIG. 2.

The FIG. 3 shows with greater details how the FFT unit 13, the IFFT unit 6 and the clipping unit articulate together.

The FFT unit and the clipping unit are depicted by a single functional block 14, performing both functions.

This block 14 has 128 inputs in the frequency domain, corresponding to 128 subcarriers spaced by $\Delta f$. These inputs are provided by the serial-to-parallel unit (corresponding to reference 5 in FIG. 2, not depicted in this FIG. 3).

The inputs correspond to data subcarriers DC (or in-band subcarrier) and out-of-band zero subcarriers ZC. There are 52 data subcarriers DC (including the pilot subcarriers), ranging from $-26 \times \Delta f$ to $26 \times \Delta f$.

The output in the time domain of the block 14 is provided to a parallel-to-serial unit (corresponding to reference 7 in FIG. 2, not depicted in this FIG. 3) as well as to the FFT unit 13.

At the output of this FFT unit 13, the out-of-band subcarriers OC are not set to zero anymore but are impacted by the spectral regrowth due to the clipping.

Some of the outputs are connected back as inputs to the block 14. The looped backed outputs correspond to the inband subcarriers (or data subcarriers, including pilot subcarriers).

However clipping spectral regrowth subcarriers are not connected to the out-of-band zero subcarriers. In other words the remaining inputs (i.e. outside of the bandwidth of these data subcarriers) are provided with out-of-band zero subcarriers ZC only, as explained above.

More concretely, zero subcarriers ZC are applied on the inputs $[-64 \times \Delta f; -27 \times \Delta f]$ and $[27 \times \Delta f; 64 \times \Delta f]$ of the block 14.

In this way, the spectral regrowth due to the clipping is rejected.

Figure 4A:
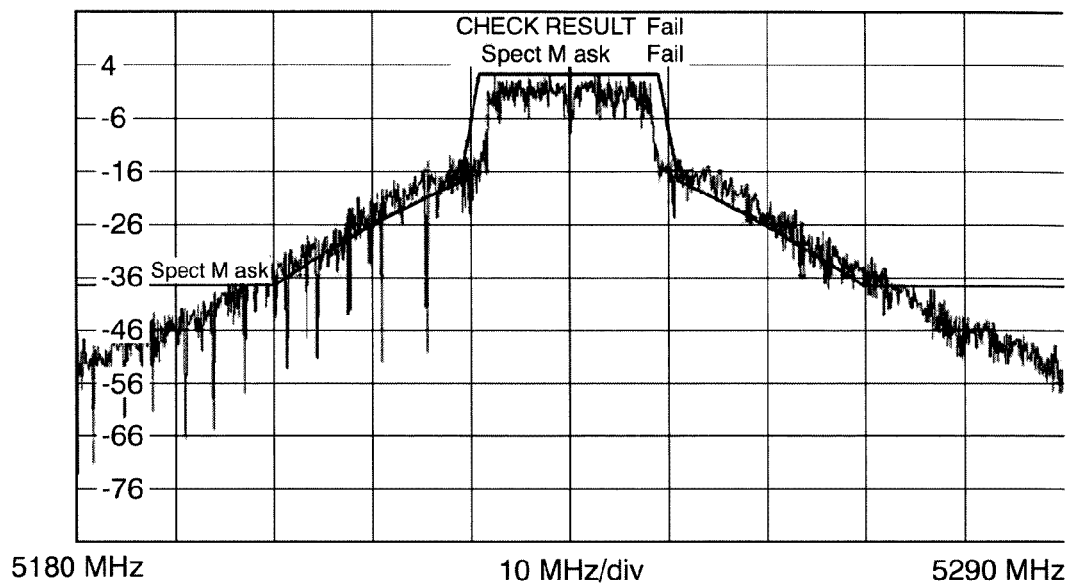
FIGS. 4a and 4b show comparison of schematic spectral shapes according to prior art solutions and to the invention.
Figure 4B:
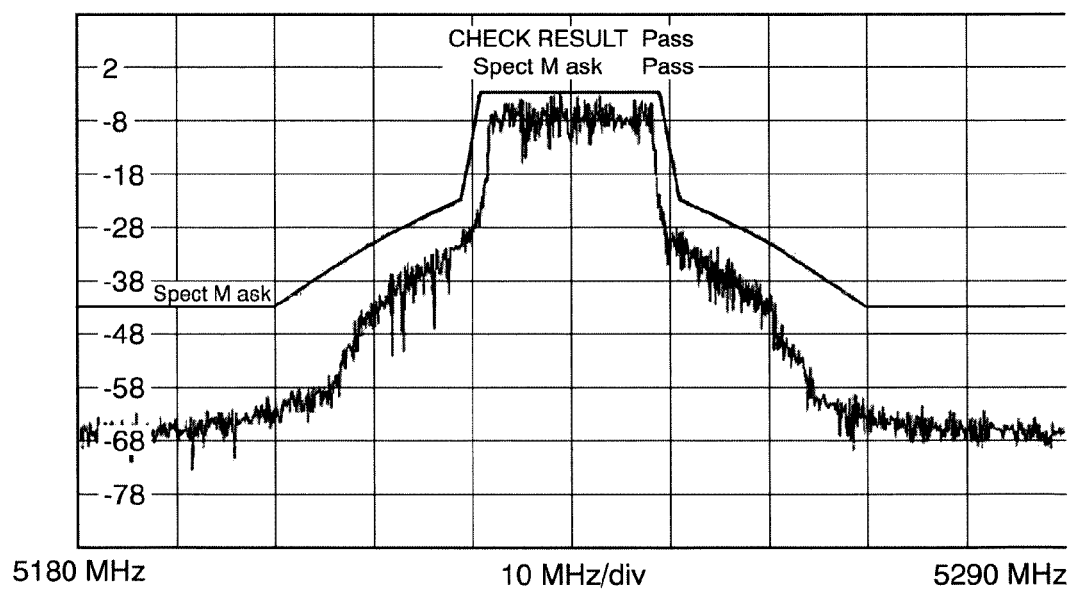

The FIGS. 4a and 4b show a comparison of schematic spectral shapes according to prior art and according to the invention.

On FIG. 4a, the 17 dB PAR signal is violating the spectral mask because it is getting clipped by the power amplifier.

On FIG. 4b, the PAR reduction from 17 dB to 7 dB implies that no clipping occurs at the power amplifier, so that the spectral mask is not violated. The spectral efficiency is reduced by only 3 dB, i.e. it is 2 times lower instead of 7 times lower according to prior art solutions.

Among other advantages, the invention can apply to any OFDM system. It is very simple to implement as it makes use of already-existing on-chip resources. It does not add analog silicon overhead, and only limited and reasonable digital silicon overhead. It provides very good performance: the PAR versus power amplification efficiency and nonlinearity problem is completely solved.

Further, although this technique is aiming at solving the PAR versus amplification efficiency issue in OFDM transmitters, it can also be used to reduce the spectral growth much lower than the specified spectral mask. The solution therefore improves the error vector magnitude (EVM).

The invention has been described with reference to preferred embodiments. However, many variations are possible within the scope of the invention.

The invention claimed is:

1. A method for modulating and emitting an orthogonal frequency division multiplexing, OFDM, signal through a transmission channel, the method comprising:

performing a first frequency-to-time conversion of input frequency symbols to generate first time symbols;

clipping said first time symbols using a clipping level selected to optimize amplification yielding the OFDM signal to be transmitted;

performing a time-to-frequency conversion of the clipped first time symbols, to obtain frequency symbols;

performing a second frequency-to-time conversion of said frequency symbols for a set of subcarriers in said transmission channel, to generate second time symbols; and serializing and amplifying said second time symbols to be emitted as the OFDM signal through said transmission channel, wherein said first frequency-to-time conversion and said second frequency-to-time conversion are performed using a same frequency-to-time converter.

2. The method according to claim 1, wherein said set of subcarriers corresponds to data subcarriers.

3. The method according to claim 1, wherein out-of-band subcarriers other than said set of subcarriers are set to zero before being applied as input of the second frequency-to-time conversion, outside of a bandwidth of data subcarriers.

4. The method according to claim 1, wherein said first and/or second time-to-frequency conversion and said frequency-to-time conversion are performed with a 128-bit algorithm.

5. The method according to claim 1, wherein said clipping level is a minimum possible clipping level leading to a minimum possible value for said peak-to-average power ratio.

6. The method according to claim 5, wherein said clipping level is −7 dB.

7. A non-transitory computer readable recording medium storing a computer program comprising program instructions loadable into a data-processing unit to cause execution of the method according to claim 1, when the computer program is run by the data processing unit.

8. An emitter for modulating and emitting an orthogonal frequency division multiplexing, OFDM, signal through a transmission channel, the emitter comprising:

a frequency-to-time converter for converting input frequency symbols into time symbols;

means for clipping time symbols connected to said frequency-to-time converter and configured to clip said time symbols;

a time-to-frequency convertor for converting said clipped time symbols into time-clipped frequency symbols; and means for applying a set of subcarriers to said time-clipped frequency symbols output by said time-to-frequency converter, said means for applying a set of subcarriers being connected to input resulting frequency symbols to said frequency-to-time converter, wherein said frequency-to-time converter converts said input resulting frequency symbols into time symbols, serializes and amplifies said time symbols to obtain said OFDM signal, and said clipping is performed using a clipping level such that to optimize amplifying of said serialized time symbols.

9. The emitter according to claim 8, wherein said set of subcarriers corresponds to data subcarriers.

10. The emitter according to claim 8, wherein said means for applying said set of subcarriers set out-of-band subcarriers other than said set of subcarriers to zero before inputting said resulting frequency symbols to the frequency-to-time converter, outside of a bandwidth of data subcarriers.

11. The emitter according to claim 8, wherein said time-to-frequency converter and said frequency-to-time converters have a length of 128 bits.

12. The emitter according to claim 8, wherein said clipping level is use a minimum possible clipping level leading to a minimum possible peak-to-average power ratio.

13. The emitter according to claim 12, wherein said clipping level is −7 dB.

14. The emitter according to claim 8, adapted to emit 802.11 standard-compliant OFDM signal.

* * * * *